US012651386B2

(12) United States Patent
Luo et al.

(10) Patent No.: US 12,651,386 B2
(45) Date of Patent: Jun. 9, 2026

(54) METHOD FOR IMPLEMENTING BRUSH STROKE OF ELECTRONIC WHITEBOARD MARKER, STORAGE MEDIUM, AND ELECTRONIC WHITEBOARD

(71) Applicant: LANGO Tech Co., Ltd., Guangzhou (CN)

(72) Inventors: Wen Luo, Guangzhou (CN); Yiqun Cai, Guangzhou (CN); Yifeng Luo, Guangzhou (CN)

(73) Assignee: LANGO Tech Co., Ltd., Guangzhou (CN)

( * ) Notice: Subject to any disclaimer, the term of this patent is extended or adjusted under 35 U.S.C. 154(b) by 293 days.

(21) Appl. No.: 18/592,552

(22) Filed: Mar. 1, 2024

(65) Prior Publication Data

US 2024/0203002 A1    Jun. 20, 2024

Related U.S. Application Data

(63) Continuation-in-part of application No. PCT/CN2022/101355, filed on Jun. 27, 2022.

(30) Foreign Application Priority Data

Sep. 1, 2021    (CN) .......................... 202111017255.5

(51) Int. Cl.
*G06K 9/00* (2022.01)
*G06F 3/04883* (2022.01)
(Continued)

(52) U.S. Cl.
CPC .......... *G06T 11/40* (2013.01); *G06F 3/04883* (2013.01); *G06T 11/23* (2026.01)

(58) Field of Classification Search
CPC ............ G06F 3/04883; G06F 3/03545; G06F 3/0483; G06F 3/04847; G06F 16/483;
(Continued)

(56) References Cited

U.S. PATENT DOCUMENTS

2003/0015355 A1* 1/2003 Kao ................... G06V 30/1423
178/18.01
2015/0161297 A1* 6/2015 Ataka ..................... G16Z 99/00
703/1
(Continued)

FOREIGN PATENT DOCUMENTS

CN      105225260 A      1/2016
CN      112148199 A      12/2020

*Primary Examiner* — Alex Kok S Liew

(57) ABSTRACT

A method for implementing a brush stroke of an electronic whiteboard marker, a storage medium, and an electronic whiteboard are disclosed. The method includes: obtaining touchpoint coordinates in a writing process, and constructing a Bézier curve equation based on the touchpoint coordinates; dividing a handwriting curve into continuous handwriting units equidistantly based on the Bézier curve equation; connecting adjacent ones of the handwriting units to form a closed compensation zone; and filling the compensation zone with a handwriting-related color. In this way, different brush strokes such as horizontal, vertical line, left-falling, and right-falling strokes can be formed, and a toothed border formed by superposition of the handwriting units can be effectively covered, making a boundary contour smoother.

12 Claims, 5 Drawing Sheets

(a)          (b)          (c)

(51) Int. Cl.
   _G06T 11/23_ (2026.01)
   _G06T 11/40_ (2006.01)
(58) Field of Classification Search
   CPC ...... G06F 16/5866; G06F 16/81; G06F 16/86;
   G06F 16/94; G06F 16/953; G06F
   16/9566; G06F 16/957; G06F 16/9577;
   G06F 3/04817; G06F 3/0482; G06F
   3/0489; G06F 40/106; G06F 40/169;
   G06F 40/20; G06F 40/30; G06F 40/109;
   G06F 3/041; G06F 2203/0382; G06F
   3/0416; G06F 3/04845; G06V 30/347;
   G06V 30/1423; G06V 30/226; G06V
   30/333; G06V 30/32; G06V 30/10; G06V
   30/19147; G06V 30/19173; G06V 10/82;
   G06V 30/1823; G06V 30/19027; G06V
   30/262; G06V 30/287; G06V 30/36;
   G06V 10/20; G06V 10/22; G06V 10/255;
   G06V 10/267; G06V 10/32
   See application file for complete search history.

(56) References Cited

U.S. PATENT DOCUMENTS

| | | | |
|---|---|---|---|
| 2016/0153796 A1* | 6/2016 | Stankoulov ........ | G01C 21/3469 |
| | | | 701/123 |
| 2021/0134029 A1* | 5/2021 | Kim ...................... | G06T 11/203 |
| 2023/0394655 A1* | 12/2023 | Ben Bashat ......... | A61B 5/0042 |

* cited by examiner

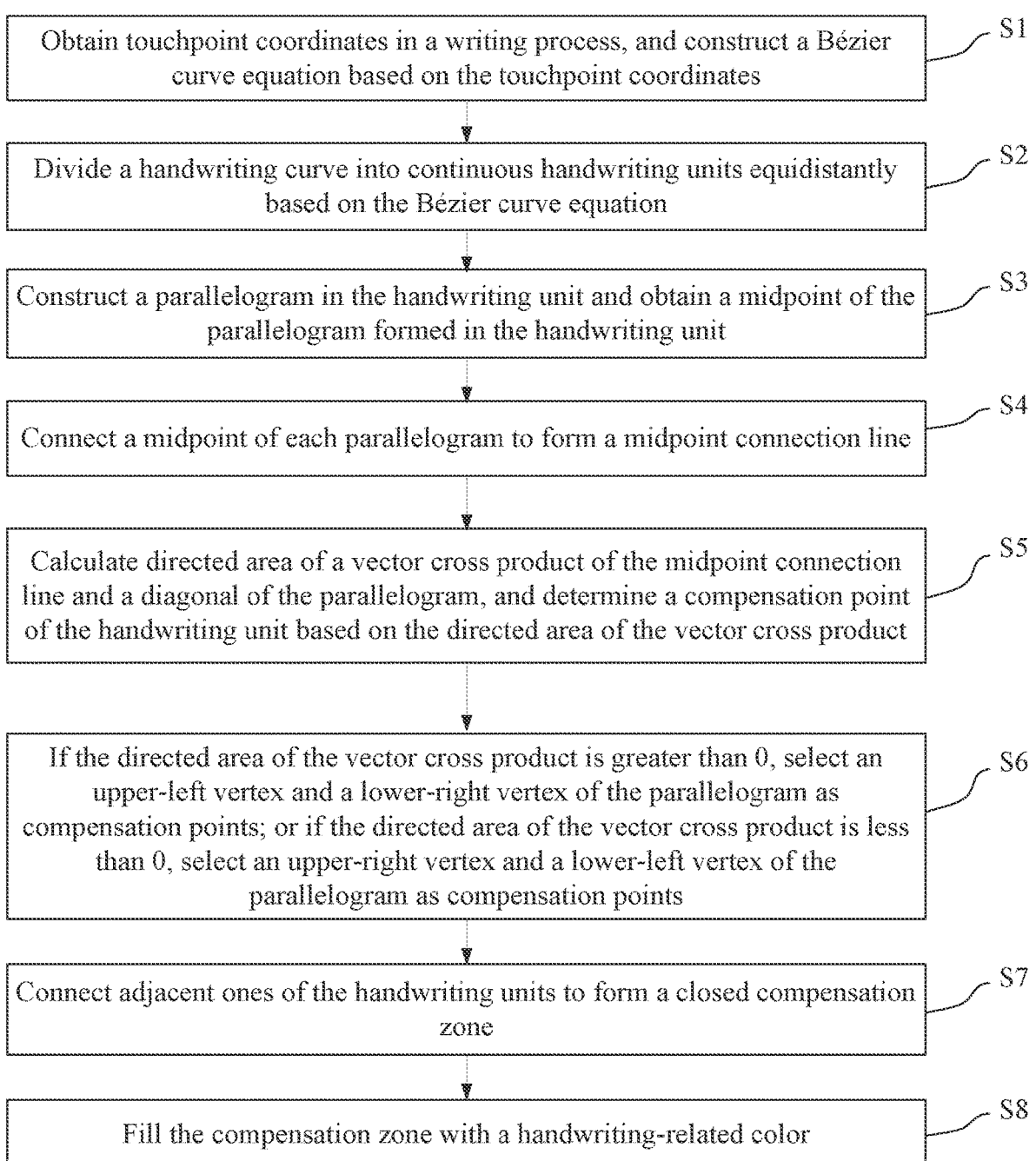

Obtain touchpoint coordinates in a writing process, and construct a Bézier curve equation based on the touchpoint coordinates — S1

Divide a handwriting curve into continuous handwriting units equidistantly based on the Bézier curve equation — S2

Construct a parallelogram in the handwriting unit and obtain a midpoint of the parallelogram formed in the handwriting unit — S3

Connect a midpoint of each parallelogram to form a midpoint connection line — S4

Calculate directed area of a vector cross product of the midpoint connection line and a diagonal of the parallelogram, and determine a compensation point of the handwriting unit based on the directed area of the vector cross product — S5

If the directed area of the vector cross product is greater than 0, select an upper-left vertex and a lower-right vertex of the parallelogram as compensation points; or if the directed area of the vector cross product is less than 0, select an upper-right vertex and a lower-left vertex of the parallelogram as compensation points — S6

Connect adjacent ones of the handwriting units to form a closed compensation zone — S7

Fill the compensation zone with a handwriting-related color — S8

METHOD FOR IMPLEMENTING BRUSH STROKE OF ELECTRONIC WHITEBOARD MARKER, STORAGE MEDIUM, AND ELECTRONIC WHITEBOARD

CROSS REFERENCE TO RELATED APPLICATIONS

The present application is a Continuation-In-Part Application of PCT Application No. PCT/CN2022/101355 filed on Jun. 27, 2022, which claims the benefit of Chinese Patent Application No. 202111017255.5 filed on Sep. 1, 2021. All the above are hereby incorporated by reference in their entirety.

TECHNICAL FIELD

The present disclosure relates to the field of screen writing technologies, and in particular, to a method for implementing a brush stroke of an electronic whiteboard marker, a storage medium, and an electronic whiteboard.

BACKGROUND

In order to enhance writing experience of a whiteboard and meet needs of different writing enthusiasts, various handwriting modes are usually set up in the whiteboard, but widths of handwritings are usually consistent. Start and end strokes are completed with a round-head brush stroke, which is similar to a handwriting of a round-head watercolor pen.

With the increasing popularity of an electronic whiteboard, a user has a higher requirement for beauty of a written character. A brush stroke added during writing can improve beauty of a typeface to a certain extent. In existing technologies, a pressure sensitive pen is used to write a character with a brush stroke, but this requires a writing pen to have a pressure sensor, which is costly and can easily damage the writing pen due to too many presses.

SUMMARY

In order to simulate an application scenario of an electronic whiteboard marker in daily life and meet needs of more users, it is required to provide a method for implementing a brush stroke of an electronic whiteboard marker, to make horizontal, vertical line, left-falling, and right-falling strokes have different widths and start and end strokes have a square-head brush stroke. Therefore, the following disclosure is proposed:

A method for implementing a brush stroke of an electronic whiteboard marker includes following steps:

obtaining touchpoint coordinates in a writing process, and constructing a Bézier curve equation based on the touchpoint coordinates;

dividing a handwriting curve into continuous handwriting units equidistantly based on the Bézier curve equation;

constructing a parallelogram in the handwriting unit and obtaining a midpoint of the parallelogram formed in the handwriting unit;

connecting a midpoint of each parallelogram to form a midpoint connection line;

calculating directed area of a vector cross product of the midpoint connection line and a diagonal of the parallelogram, and determining a compensation point of the handwriting unit based on the directed area of the vector cross product;

if the directed area of the vector cross product is greater than 0, selecting an upper-left vertex and a lower-right vertex of the parallelogram as compensation points; or if the directed area of the vector cross product is less than 0, selecting an upper-right vertex and a lower-left vertex of the parallelogram as compensation points;

connecting compensation points of adjacent ones of the handwriting units to form a closed compensation zone; and filling the compensation zone with a handwriting-related color.

Further, the constructing a parallelogram in the handwriting unit specifically includes following steps:

obtaining midpoints of top and bottom edges of the handwriting unit; and connecting an upper-left vertex of the handwriting unit to the midpoint of the bottom edge, and connecting the midpoint of the top edge of the handwriting unit to a lower-right vertex, to form the parallelogram.

Further, a distance between the handwriting units obtained through the division is one fourth of a current handwriting width.

Further, the handwriting unit is a rectangle.

A computer-readable storage medium stores a computer program, where the computer program is executed by a processor to implement the foregoing method for implementing a brush stroke of an electronic whiteboard marker.

An electronic whiteboard includes:

at least one processor;

a memory; and at least one application program, where the at least one application program is stored in the memory and configured to be executed by the at least one processor, and the at least one application program is configured to execute the foregoing method for implementing a brush stroke of an electronic whiteboard marker.

The present disclosure divides a writing trajectory into a plurality of small handwriting units for displaying, such that different superposition effects can be presented in each handwriting unit during drawing, forming different brush strokes such as horizontal, vertical line, left-falling, and right-falling strokes. In addition, compensation points of adjacent handwriting units are calculated, connected, and relevant colors are filled based on the compensation points, which can effectively cover a toothed border formed by superposition of the handwriting units, making a boundary contour smoother.

BRIEF DESCRIPTION OF THE DRAWINGS

FIG. 1 is a flowchart of steps of a method for implementing a brush stroke of an electronic whiteboard marker according to an embodiment of the present disclosure;

DETAILED DESCRIPTION

The embodiments of the present disclosure will be described in detail below with reference to the accompanying drawings.

The implementations of the present disclosure are described below through specific examples, and those skilled in the art can easily understand other advantages and effects of the present disclosure from the contents disclosed in this specification. Apparently, the described embodiments are merely a part rather than all of the embodiments of the present disclosure. The present disclosure can also be implemented or applied through other different specific implementations. Based on different viewpoints and applications, various modifications or amendments can be made to various details of this specification without departing from the spirit of the present disclosure. It should be noted that the following embodiments and features in the embodiments may be combined with each other provided that no conflict occurs. All other embodiments obtained by a person of ordinary skill in the art based on the embodiments of the present disclosure without creative efforts should fall within the protection scope of the present disclosure.

Embodiment 1

As shown in FIG. 1, a method for implementing a brush stroke of an electronic whiteboard marker includes following steps:

Step S1: Obtain touchpoint coordinates in a writing process, and construct a Bézier curve equation based on the touchpoint coordinates.

In a specific implementation process of the present disclosure, the electronic whiteboard marker may be a regular paintbrush, a finger of a user, or a pressure sensitive pen. The writing process is carried out in a touch screen of an electronic whiteboard 1. The touch screen may be a capacitive touch screen, an infrared touch screen, or another touch screen. A coordinate system is constructed on the touch screen. When the electronic whiteboard marker moves to write on the touch screen of the electronic whiteboard 1, the electronic whiteboard 1 collects, by using the touch screen, each coordinate value of each coordinate point that the electronic whiteboard marker passes through in the touch screen, in other words, values of a coordinate point (x, y).

Step S2: Divide a handwriting curve into continuous handwriting units equidistantly based on the Bézier curve equation.

Figure 2:
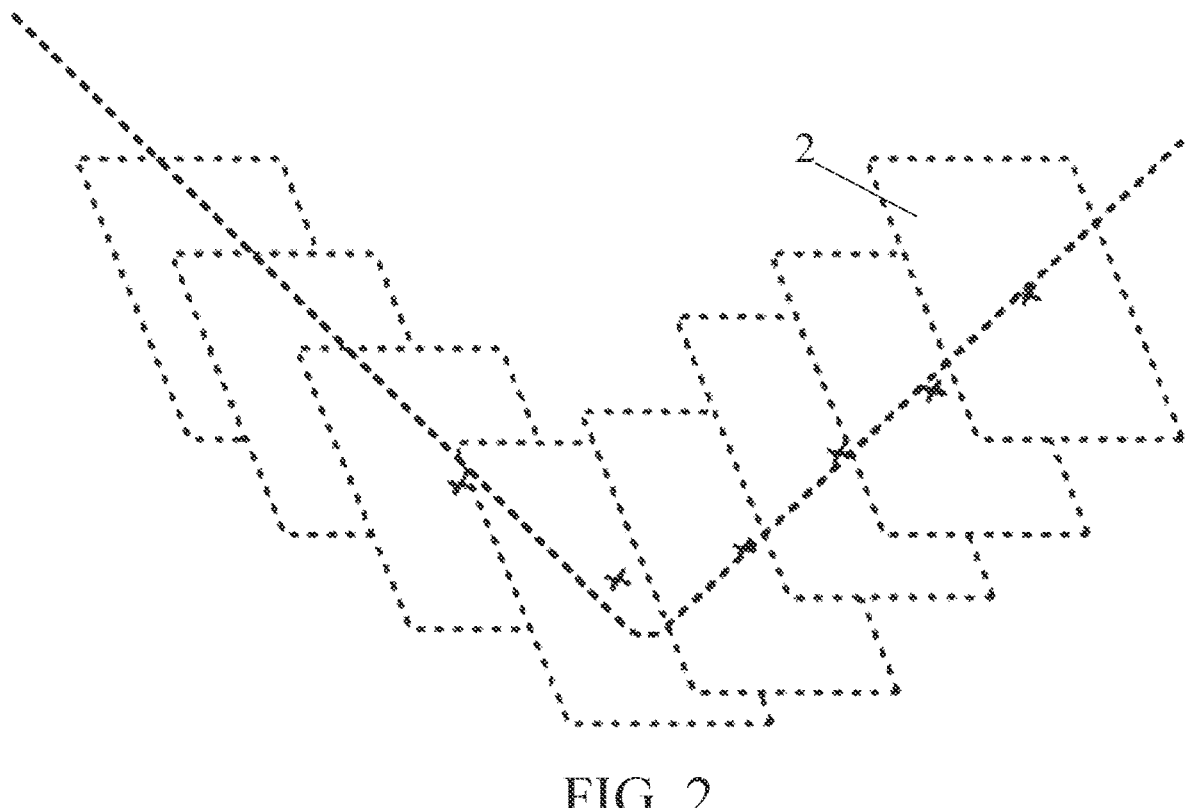
FIG. 2 is a schematic diagram of a part of a handwriting curve according to an embodiment of the present disclosure.
Figures 5, 6, 7:
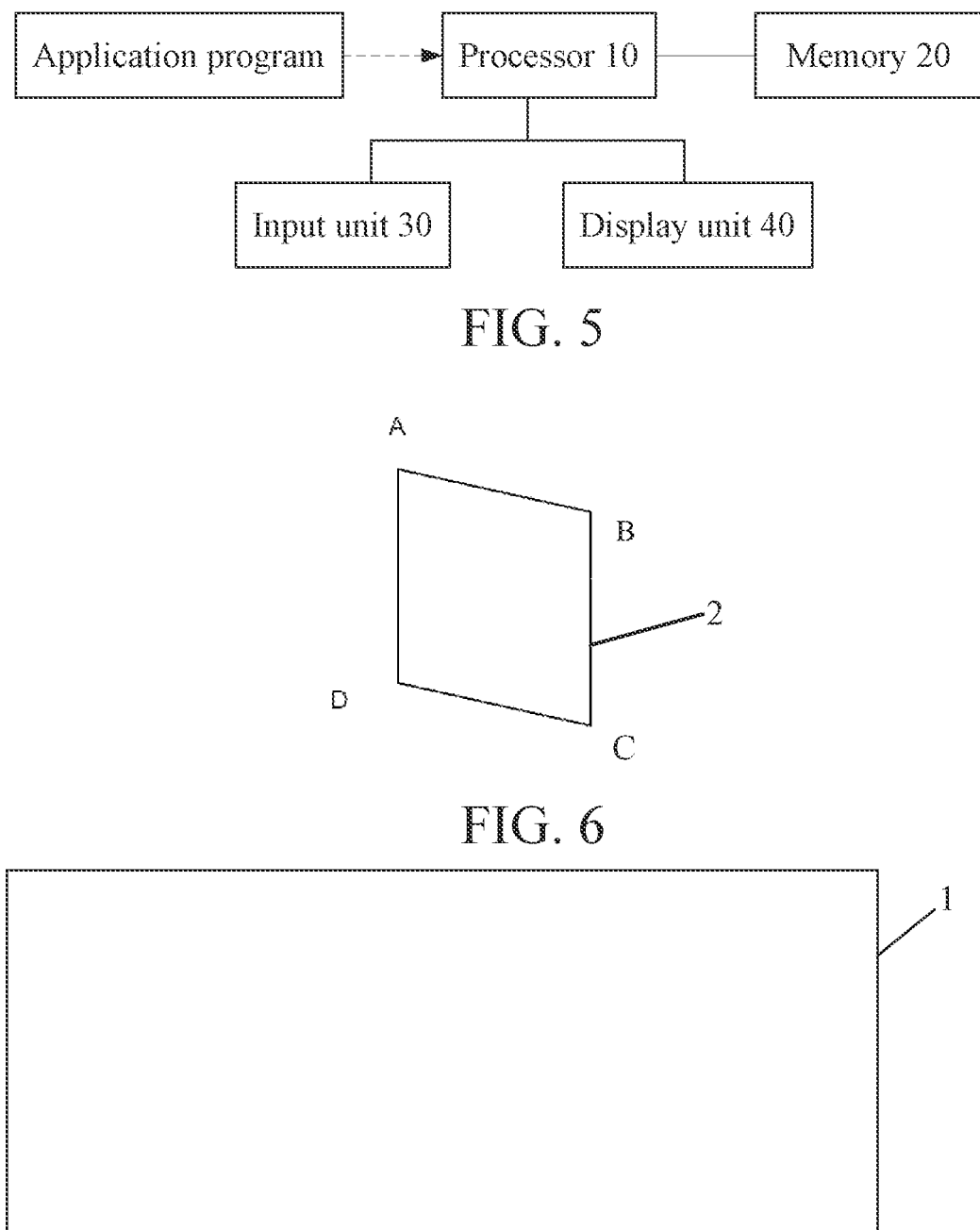
FIG. 5 is a schematic structural diagram of an electronic whiteboard according to an embodiment of the present disclosure.
FIG. 6 is a schematic diagram of a handwriting unit according to an embodiment of the present disclosure.
FIG. 7 is a schematic structural diagram of an electronic whiteboard according to an embodiment of the present disclosure.

A Bézier curve is a mathematical curve applied to a two-dimensional graphics application, and is used by general vector graphics software to accurately draw a curve. The Bézier curve is composed of a line segment and a node. The node is a draggable fulcrum, and the line segment is like a stretchable rubber band. As shown in FIG. 2 and FIG. 6, the electronic whiteboard 1 obtains the handwriting curve through fitting based on touch time of the user, and then divides the handwriting curve into the continuous handwriting units 2. In each handwriting unit 2, a same parallelogram is drawn, and superposition effects of parallelograms under different strokes form different brush strokes.

Step S3: Construct the parallelogram in the handwriting unit and obtain a midpoint of the parallelogram formed in the handwriting unit.

Usually, the handwriting unit 2 is represented as a rectangle. An upper-left vertex of a top edge of the rectangle is connected to a point located at ½ of a bottom edge, and a point located at ½ of the top edge of the rectangle is connected to a lower-right vertex of the bottom edge, to form an oblique quadrilateral.

Step S4: Connect a midpoint of each parallelogram to form a midpoint connection line.

Step S5: Calculate directed area of a vector cross product of the midpoint connection line and a diagonal of the parallelogram, and determine a compensation point of the handwriting unit based on the directed area of the vector cross product.

Step S6: If the directed area of the vector cross product is greater than 0, select an upper-left vertex and a lower-right vertex of the parallelogram as compensation points; or if the directed area of the vector cross product is less than 0, select an upper-right vertex and a lower-left vertex of the parallelogram as compensation points.

Figure 3:
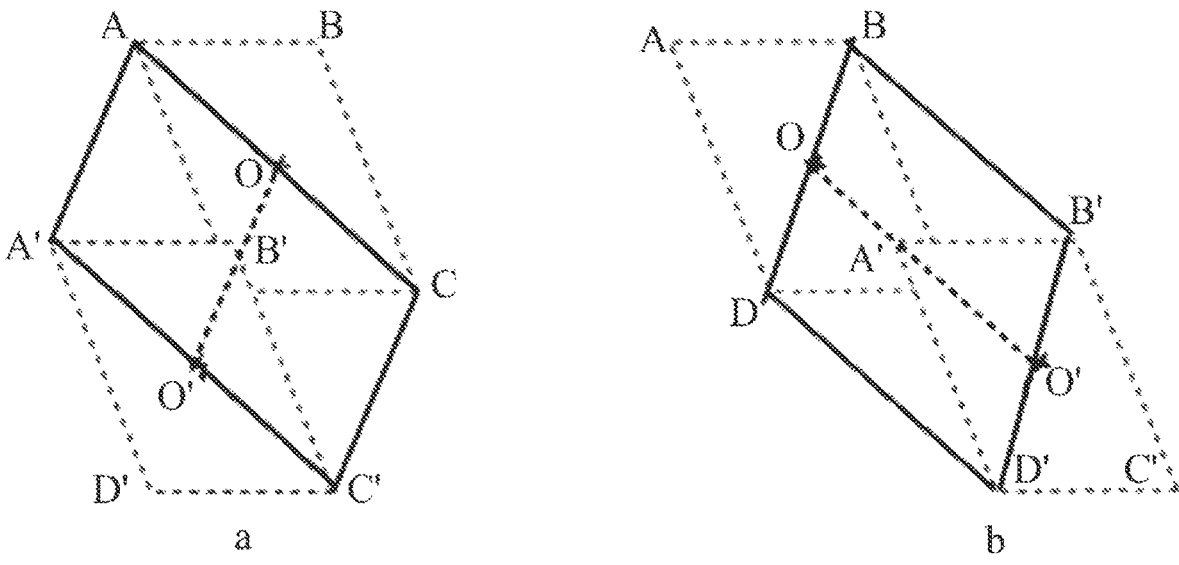
FIG. 3 is a schematic diagram of constituting a compensation zone according to an embodiment of the present disclosure.

As shown in FIG. 3, midpoints O and O' of two adjacent handwriting units are connected, and coordinates of the two midpoints O and O', and coordinates of two vertexes of a diagonal AC of a parallelogram ABCD corresponding to the handwriting units are obtained. The midpoints O and O' and the diagonal AC of the parallelogram ABCD are taken as two vectors, and directed area of a vector cross product of the two vectors are calculated based on the coordinates of the two midpoints O and O' and the coordinates of the two vertexes of the diagonal AC of the parallelogram to obtain different compensation points. If the directed area of the cross product of the vectors is greater than 0, an upper-left vertex A and a lower-right vertex C of the parallelogram are selected as the compensation points, as shown in case a in FIG. 3. If the directed area of the vector cross product is less than 0, an upper-right vertex B and a lower-left vertex D of the parallelogram ABCD are selected as the compensation points, as shown in case b in FIG. 3. Similarly, an upper-left vertex A' and a lower-right vertex C' of the adjacent handwriting unit A'B'C'D' are selected as the compensation points, or an upper-right vertex B' and a lower-left vertex D' of the handwriting unit A'B'C'D' are selected as the compensation points.

As shown in FIG. 3, adjacent vertex connection lines AA' and CC' are connected to form a quadrilateral AA'C'C, forming a closed compensation zone AA'C'C, or adjacent vertex connection lines BB' and DD' are connected to form a quadrilateral BB'D'D, forming a closed compensation zone BB'D'D. The closed compensation zone is filled with a relevant color, such as a color the same as a color of a handwriting, to form a compensation zone that covers a blank region and avoids a rectangle formed by vertexes.

Figure 4:
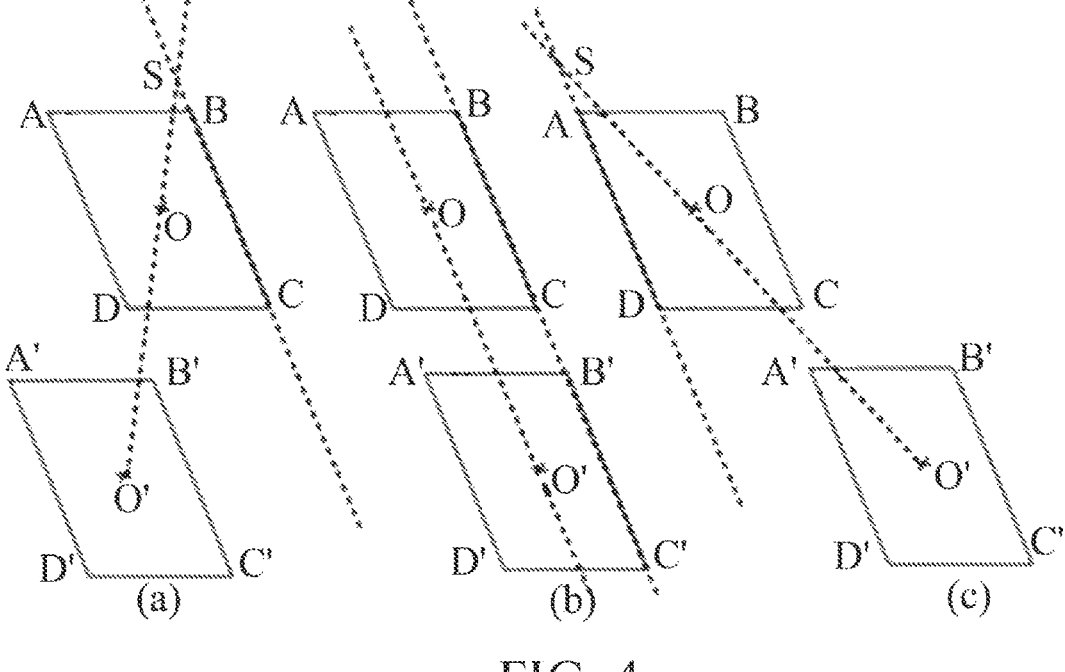
FIG. 4 is a schematic diagram of calculating directed area of a vector cross product according to an embodiment of the present disclosure.

Further, referring to FIG. 4, it is assumed that the handwriting unit 2 is a parallelogram ABCD whose midpoint is O, and a line connecting the midpoint O and a midpoint O' of an adjacent handwriting unit 2 (namely, a parallelogram A'B'C'D') is OO'. An edge BC (or AD) of the parallelogram ABCD is taken as a reference, and it can be found that a parallel line of the line OO' parallelly coincides with the edge BC (or AD), or is located on a right side of the edge BC (or AD) line, or is located on a left side of the edge BC (or AD).

As shown in FIG. 4, assuming that the BC intersects with the line OO' at a point S, a vector SC and a vector SO' are formed. Assuming that coordinates of the point S are ($X_S$, $Y_S$), coordinates of a point C are ($X_C$, $Y_C$), and coordinates of the point O' are ($X_{O'}$, $Y_{O'}$), a formula for calculating directed area of a cross product of a vector BC and a vector OO' is $|SO' \times SC| = (X_{O'} - X_S) \times (Y_C - Y_S) - (X_C - X_S) \times (Y_{O'} - Y_S)$. Based on a geometric property of the vector cross product, if the directed area of the cross product is greater than 0, it indicates that the vector SC is located on a counterclockwise side of the vector SO' (see case a in the figure). If the directed area of the cross product is less than 0, it indicates that the vector SC is located on a clockwise side of the vector SO' (see case c in the figure). If the directed area of the cross product is equal to 0, it indicates that the vector SC and the vector SO' are parallel (see case b in the figure). When the directed area of the vector cross product is greater than 0, an upper-left vertex A and the lower-right vertex C of the parallelogram ABCD are selected as the compensation points. If the directed area of the vector cross product is less than 0, an upper-right vertex B and a lower-left vertex D of the parallelogram ABCD are selected as the compensation points. When the directed area of the vector cross product is equal to 0, the two handwriting units 2 are parallel, and either of the above two schemes can be selected. Similarly, an upper-left vertex A' and a lower-right vertex C' of the adjacent handwriting unit A'B'C'D' are selected as the compensation points, or an upper-right vertex B' and a lower-left vertex D' of the handwriting unit A'B'C'D' are selected as the compensation points. The compensation points of the handwriting unit ABCD and the adjacent handwriting unit A'B'C'D' form a closed compensation zone AA'C'C or a closed compensation zone BB'D'D.

Further, in a preferred embodiment of the present disclosure, the handwriting unit 2 is a rectangle.

Further, in a preferred embodiment of the present disclosure, the step S3 specifically includes following steps:

obtaining midpoints of the top and bottom edges of the handwriting unit; and connecting the upper-left vertex of the handwriting unit to the midpoint of the bottom edge, and connecting the midpoint of the bottom edge of the handwriting unit to the lower-right vertex, to form the parallelogram.

Step S7: Connect adjacent ones of the handwriting units to form a closed compensation zone.

Regardless of which direction the curve is facing, the handwriting unit 2 preserves quadrilaterals in a same direction. Therefore, during extension in different directions, a cross-section of a curve generated by unit superposition has different widths, achieving different superposition effects.

Step S8: Fill the compensation zone with a handwriting-related color.

Further, in a preferred embodiment of the present disclosure, a distance between the handwriting units obtained through the division is one fourth of a current handwriting width.

Figure 8:
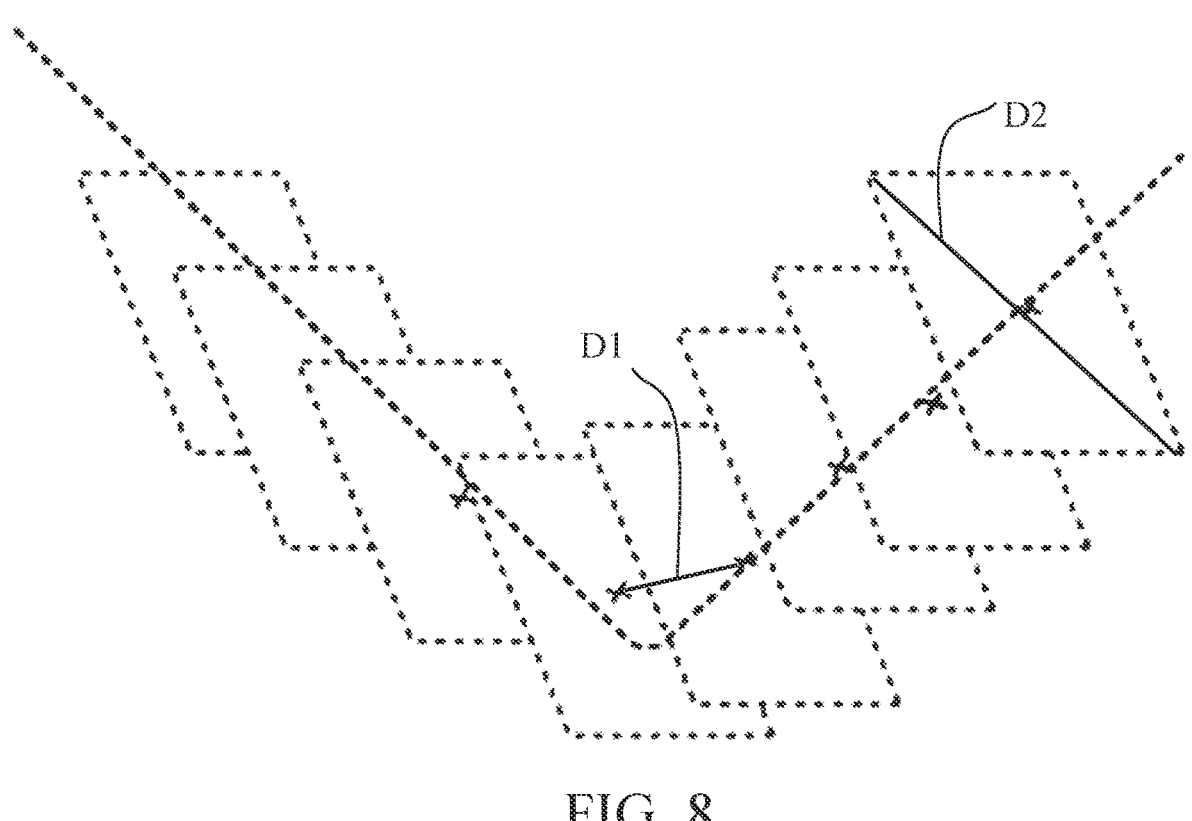
FIG. 8 is a schematic diagram of a distance between handwriting units obtained through division and a handwriting width according to an embodiment of the present disclosure.

As shown in FIG. 8, specifically, the distance D1 between the handwriting units obtained through the division is a midpoint connection line of two adjacent handwriting units, and the handwriting width D2 is a length of a longest diagonal of the handwriting unit.

A computer-readable storage medium stores a computer program. The computer program is executed by a processor to implement the foregoing method for implementing a brush stroke of an electronic whiteboard marker.

An electronic whiteboard includes:

at least one processor;

a memory; and at least one application program, where the at least one application program is stored in the memory and configured to be executed by the at least one processor, and the at least one application program is configured to execute the foregoing method for implementing a brush stroke of an electronic whiteboard marker.

The embodiments of the present disclosure also provide an electronic whiteboard 1, as shown in FIG. 5 and FIG. 7. The electronic whiteboard 1 includes devices such as a processor 10, a memory 20, an input unit 30, and a display unit 40. A person skilled in the art may understand that a structure shown in FIG. 5 does not constitute a limitation to the electronic whiteboard 1, and the electronic whiteboard 1 may include more or fewer components than those shown in the figure, or some components may be combined. The memory 20 can be configured to store application programs and various functional modules. The processor 10 runs the application programs stored in the memory 20 to perform various functional applications and data processing of the electronic whiteboard 1. The memory 20 may be an internal memory or an external memory, or may include both an internal memory and an external memory. The internal memory may include a read-only memory (ROM), a programmable ROM (PROM), an electrically programmable ROM (EPROM), an electrically erasable programmable ROM (EEPROM), a flash memory, or a random access memory (RAM). The external memory may include a hard drive, a floppy disk, a ZIP disk, a USB flash disk, a magnetic tape, and the like. The memory disclosed in the present disclosure includes, but is not limited these types of memories. The memory disclosed in the present disclosure is only an example and not a limitation.

The input unit 30 is configured to receive an input signal and receive a keyword input by a user. The input unit 30 may include a touch panel and another input device. The touch panel can collect a touch operation performed by the user on or near the touch panel (such as an operation performed by the user on or near the touch panel by using any suitable object such as a finger or a stylus), and drive a corresponding connection apparatus according to a preset program. The another input device may include but is not limited to one or more of a physical keyboard, a function key (such as a volume control key or a switch key), a trackball, a mouse, a joystick, and the like. The display unit 40 can be configured to display information input by or provided to the user and various menus of the electronic whiteboard 1. The display unit 40 may be in a form of a liquid crystal display (LCD), an organic light emitting diode (OLED), or the like. The processor 10 is a control center of the electronic whiteboard 1, and various parts of the whole electronic whiteboard 1 are connected by using various interfaces and lines. By running or executing the software programs and/or modules stored in the memory 20 and invoking data stored in the memory 20, the processor 10 implements various functions and processes data. A person skilled in the art can clearly understand that, for convenience and brevity of description, reference may be made to corresponding processes in the foregoing method embodiments for specific working processes of the foregoing systems, apparatuses, and units. Details are not described herein again.

In a specific implementation process of the present disclosure, values of each coordinate point that a paintbrush (which may be a regular paintbrush or a finger of the user) passes through in a touch screen are collected, and corresponding time is obtained. The collected coordinate point values and the obtained time are stored in the memory together, and two coordinate point values of last time are extracted to predict coordinates of an end point of a brush stroke. Then based on a distance between coordinate point values at a last time point and the predicted coordinates of the end point, filling is performed according to a preset handwriting filling rule. In this way, a beautiful brush stroke can be written without using a touch sensitive pen. In addition, there is no high requirement for a touch screen, and a regular infrared touch screen is sufficient. The paintbrush may not be a pressure sensitive pen, but may be the regular paintbrush or the finger of the user. This reduces a hardware cost of the user without worrying about damage to the paintbrush, thereby providing the user with good user experience.

In several embodiments provided in the present disclosure, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The above integrated unit may be implemented either in a form of hardware or in a form of a software functional unit.

The integrated unit, if implemented in the form of a software functional unit and sold or used as a stand-alone product, may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium, and includes instructions for instructing a computer device (which may be a personal computer, a server, a network device, or the like) to perform all or some of the operations of the methods described in the embodiments of the present disclosure. The foregoing storage medium includes a USB flash disk, a mobile hard disk, a ROM, a RAM, a magnetic disk, an optical disk, or the like, which can store program code.

The invention claimed is:

1. A method for implementing a brush stroke of an electronic whiteboard marker, comprising following steps:
  obtaining touchpoint coordinates in a writing process, and constructing a Bézier curve equation based on the touchpoint coordinates;
  dividing a handwriting curve into continuous handwriting units equidistantly based on the Bézier curve equation;

constructing a parallelogram in the handwriting unit and obtaining a midpoint of the parallelogram formed in the handwriting unit;
  connecting a midpoint of each parallelogram to form a midpoint connection line;
  calculating directed area of a vector cross product of the midpoint connection line and a diagonal of the parallelogram, and determining a compensation point of the handwriting unit based on the directed area of the vector cross product;
  if the directed area of the vector cross product is greater than 0, selecting an upper-left vertex and a lower-right vertex of the parallelogram as compensation points; or if the directed area of the vector cross product is less than 0, selecting an upper-right vertex and a lower-left vertex of the parallelogram as compensation points;
  connecting compensation points of adjacent ones of the handwriting units to form a closed compensation zone; and
  filling the compensation zone with a handwriting-related color.

2. The method for implementing a brush stroke of an electronic whiteboard marker according to claim 1, wherein the constructing a parallelogram in the handwriting unit specifically comprises following steps:
  obtaining midpoints of top and bottom edges of the handwriting unit; and
  connecting an upper-left vertex of the handwriting unit to the midpoint of the bottom edge, and connecting the midpoint of the top edge of the handwriting unit to a lower-right vertex, to form the parallelogram.

3. The method for implementing a brush stroke of an electronic whiteboard marker according to claim 1, wherein a distance between the handwriting units obtained through the division is one fourth of a current handwriting width.

4. The method for implementing a brush stroke of an electronic whiteboard marker according to claim 2, wherein the handwriting unit is a rectangle.

5. A computer-readable storage medium, storing a computer program, wherein the computer program is executed by a processor to implement the method for implementing a brush stroke of an electronic whiteboard marker according to claim 1.

6. The computer-readable storage medium according to claim 5, wherein the constructing a parallelogram in the handwriting unit specifically comprises following steps:
  obtaining midpoints of top and bottom edges of the handwriting unit; and
  connecting an upper-left vertex of the handwriting unit to the midpoint of the bottom edge, and connecting the midpoint of the top edge of the handwriting unit to a lower-right vertex, to form the parallelogram.

7. The computer-readable storage medium according to claim 5, wherein a distance between the handwriting units obtained through the division is one fourth of a current handwriting width.

8. The computer-readable storage medium according to claim 6, wherein the handwriting unit is a rectangle.

9. An electronic whiteboard, comprising:
  at least one processor;
  a memory; and
  at least one application program, wherein the at least one application program is stored in the memory and configured to be executed by the at least one processor, and the at least one application program is configured to execute the method for implementing a brush stroke of an electronic whiteboard marker according to claim 1.

10. The electronic whiteboard according to claim 9, wherein the constructing a parallelogram in the handwriting unit specifically comprises following steps:

obtaining midpoints of top and bottom edges of the handwriting unit; and connecting an upper-left vertex of the handwriting unit to the midpoint of the bottom edge, and connecting the midpoint of the top edge of the handwriting unit to a lower-right vertex, to form the parallelogram.

11. The electronic whiteboard according to claim 9, wherein a distance between the handwriting units obtained through the division is one fourth of a current handwriting width.

12. The electronic whiteboard according to claim 10, wherein the handwriting unit is a rectangle.

\* \* \* \* \*